(No Model.) 2 Sheets—Sheet 2.
H. GUELS.
AUTOMATIC FLUID PRESSURE BRAKE MECHANISM.
No. 524,759. Patented Aug. 21, 1894.
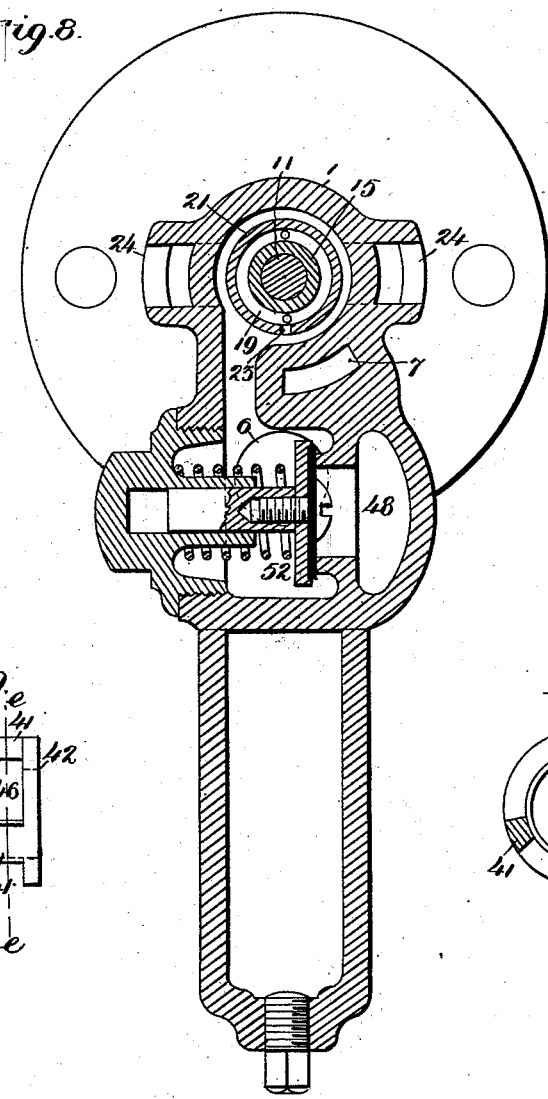
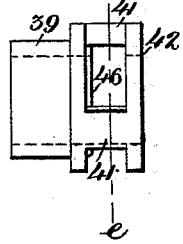
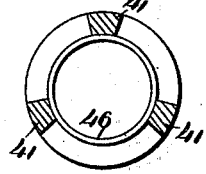
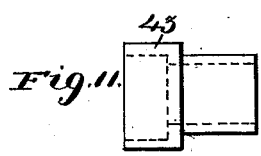
Witnesses:
Jno B Dempsey
J. T. Spless
Inventor:
Herman Guels.
By Keeler & Sterck
Attorneys.

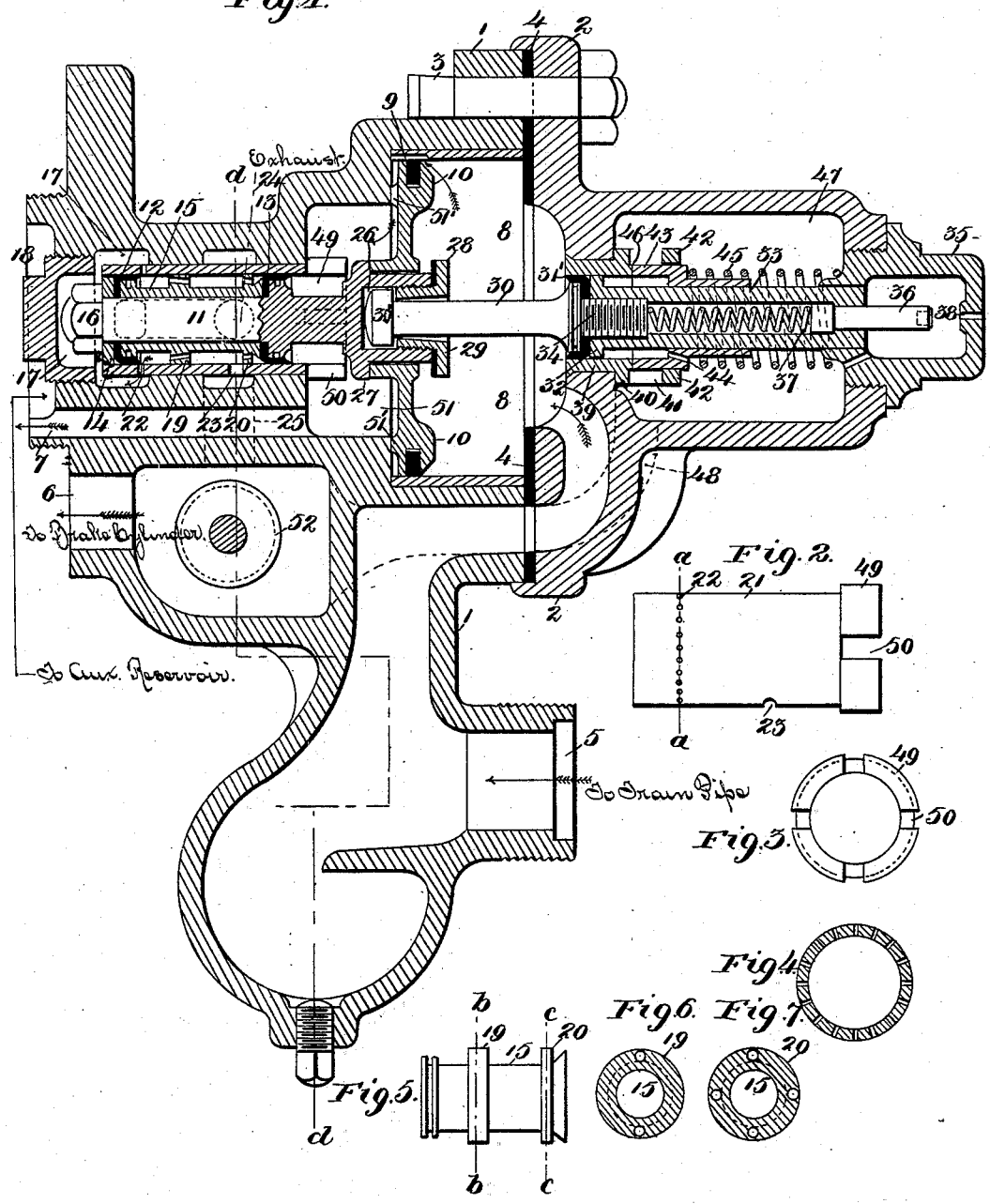

UNITED STATES PATENT OFFICE.

HERMAN GUELS, OF ST. LOUIS, MISSOURI, ASSIGNOR TO THE LANSBERG BRAKE COMPANY, OF SAME PLACE.

AUTOMATIC FLUID-PRESSURE BRAKE MECHANISM.

SPECIFICATION forming part of Letters Patent No. 524,759, dated August 21, 1894.

Application filed April 2, 1894. Serial No. 505,991. (No model.)

*To all whom it may concern:*

Be it known that I, HERMAN GUELS, of the city of St. Louis, State of Missouri, have invented certain new and useful Improvements in Automatic Fluid-Pressure Brake Mechanisms, of which the following is a full, clear, and exact description, reference being had to the accompanying drawings, forming a part hereof.

My invention has relation to improvements in automatic fluid pressure brake mechanisms, and consists in the novel arrangement and combination of parts more fully set forth in the specification and pointed out in the claims.

In the drawings, Figure 1 is a vertical longitudinal section of the valve. Fig. 2 is a plan view of the bushing within which the left end of the stem operates. Fig. 3 is an end view of the same. Fig. 4 is a section on $a$—$a$ of Fig. 2. Fig. 5 is a plan view of the tube controlling the ports of the bushing. Fig. 6 is a section on $b$—$b$ of Fig. 5. Fig. 7 is a section on $c$—$c$ of Fig. 5. Fig. 8 is a section on $d$—$d$ of Fig. 1. Fig. 9 is a plan view of the bushing and cage within which the emergency valve and cup operate. Fig. 10 is a section on $e$—$e$ of Fig. 9; and Fig. 11 is a plan view of the emergency cup.

The present invention is an improvement on the valve described in Letters Patent No. 468,240, dated February 2, 1892, granted to W. F. De Forest, and has for its object to simplify the construction therein shown, to reduce the number of parts, to make the same more sensitive and more readily responsive to variations of pressure in the train pipe, to reduce the friction and binding incident to the arrangement shown in said valve, and on the whole to make a more desirable mechanism for the purpose for which the same is intended. It is to be understood of course that the present valve relates to that class of brake mechanisms wherein air is admitted from an auxiliary reservoir into the brake cylinder to put on the brakes for service stops, and wherein air both from the train pipe and said reservoir is admitted for putting on the brakes in emergency cases. In detail the valve may be described as follows:

Referring to the drawings, the mechanism is composed of a sectional casing having sections 1 and 2 held together by bolts 3, suitable packing 4 being interposed between the sections. The section 1 has passages 5, 6, and 7 leading respectively to the train pipe, brake cylinder, and auxiliary reservoir as fully indicated in Fig. 1. Between the two sections 1 and 2 is the main valve chamber 8 whose inner wall is provided with a feeding groove 9 controlled by the main piston 10. The said piston controls communication between the train pipe and auxiliary reservoir, and upon a slight reduction of pressure within the train pipe, the excess of pressure from the auxiliary reservoir immediately drives the said piston to the right, closing the said feeding groove 9. To the left of the piston 10 operates within limits determined by the extreme positions of the latter, a stem 11 carrying the bucket valves 12 and 13, the former being formed by interposing suitable packing between the washer 14 and one end of the cylindrical tube 15, and the other by interposing suitable packing between the opposite end of the tube and an annular collar in the path of the stem. The several parts are secured by a nut 16 the whole confined in a chamber 17 capped by a plug 18. The tube 15 is guided by annular flanges 19 and 20 having suitable openings for the passage of air (preferably only two openings in the extreme left flange for governing the admission of air into brake cylinder in emergency cases), said tube and valves operating within a bushing 21 having a series of ports 22 and a port 23 controlled by said valves. The ports 22 communicate with the chamber 17 and thence with the atmosphere through the exhaust passage 24; and the port 23 communicates with the passage 25 leading to the brake cylinder. The right hand end of the stem 11 terminates in an interior cavity 26 surrounded by an exterior flange 27 between which and the adjacent face of the flange 28 of a split nut 29 the piston 10 operates and by which arrangement it has an independent and advance movement of said stem. The cavity 26 is interiorly screw-threaded the flanged nut 29 being screwed therein. Through the nut 29 passes one end of a stem 30 carrying a head 30' confined within the cavity and prevented from being withdrawn by the said nut 29. The stem 30 carries a bucket 31 serving as the emergency valve and formed by interposing suitable packing between the expanded right hand end of the stem and the flange 32 of the sleeve 33 secured to the screw-threaded projection 34 of the stem. The right hand end of the sleeve 33 operates within the cap piece 35 and carries the movable graduating stem 36 controlled by the spring 37 within the sleeve, the graduating stem 36 controlling the port 38, closing the same when the air is admitted from the auxiliary reservoir to the brake cylinder, these parts operating in the same way as the corresponding parts in the De Forest valve above referred to.

The emergency valve 31 operates within the bushing 39 from a flange 40 of which project the guide fingers 41 terminating in a rim 42, the whole forming a guide cage for the valve. These guide fingers 41 truly guide the movement of the cup 43 having ports 44 which prevent the air from being imprisoned therein and compressed by the emergency valve 31'. The cup is held in its normal position by a spiral spring 45 coiled around the sleeve 33 and resting at its other end against the cap 35. The left hand edge of the cup normally rests against the annular seat 46 of the bushing 39 adjacent to the guide fingers 41. It will thus be seen that the emergency valve 31' and the cup 43 are truly guided by the bushing 39 and the guide fingers 41 in their control of the communication between the main valve chamber 8 and the chamber 47 communicating through the passage 48 with the brake cylinder. In like manner is the stem 11 truly guided by the flanges 19 and 20 of the tube 15 moving within the bushing 21, and the packing of the valve 13 is prevented from spreading after it has passed the bushing proper, being guided by the segmental cage 49 projecting from the bushing 21, said cage 49 having slots 50 to allow the free passage of air from the chamber 51 located on the left of the main piston 10 to the port 23 communicating with the passage 25 leading to the brake cylinder. Under the old construction it has been found that the leather of the bucket 13 was spread by the air pressure as said air passed by said valve or bucket 13 in its passage from the chamber 51 to the brake cylinder and before the air pressure between these extreme chambers was fully equalized. In the present construction however the bucket is prevented from spreading by the cage 49 above referred to, and there is consequently never any danger of the valve sticking.

The operation of the present valve is in all respects similar to that of the De Forest valve, and can be described with reference to three conditions. In the first place let us assume that the auxiliary reservoir is empty. Air is admitted from the main reservoir (not shown) into the train pipe and travels through passage 5 into the main valve chamber 8 forcing the main piston 10 to feeding position, that is, the position shown in Fig. 1, thus bringing its seat 51' against the casing and establishing communication via chamber 8, feed groove 9, chamber 51, and passage 7 between the train pipe and the auxiliary reservoir. At the same time the remaining parts of the mechanism will be as shown in Fig. 1, the brake cylinder communicating via passage 25, port 23, ports 22, chamber 17 with the exhaust passage 24 and this with the atmosphere. The emergency valve 31' too closes communication between the valve chamber 8 and chamber 47 communicating with the passage 48 leading to the brake cylinder.

The second condition contemplates a gradual reduction of air pressure within the train pipe for application of brakes in ordinary service stops. The train pipe pressure is gradually reduced (say eight pounds) on the right of the main piston 10; the excess of pressure on the left thereof from the auxiliary reservoir immediately drives the main piston 10 to the right closing the feed groove 9. There being very little friction and weight to overcome (the piston having an independent advance movement of the stem), the said piston is responsive to the slightest variation of air pressure within the train pipe. A further reduction or repeated reduction in the train pipe, and after the main piston has come in contact with the flange 28 of the nut 29 will drive the stem 11 to the right, the bucket 12 closing the ports 22, and the bucket 13 passing sufficiently to the right of the bushing 21 proper to allow air from the chamber 51 to pass into port 23, passage 25 into the brake cylinder, thus applying the brakes gradually. While this is occurring the emergency valve 31 and sleeve 33 connected thereto have caused the movable stem 36 to close the port 38, and the spring 37 in the said sleeve prevents the parts from moving farther to the right and thus graduates the movement of the parts. As soon as the engineer allows the pressure within the train pipe to resume its normal condition the main piston 10 and all the parts connected thereto are forced to their original positions as shown in Fig. 1.

The third and last condition contemplates a sudden reduction of air pressure within the train pipe for application of brakes in emergency cases. A reduction of ten pounds or more quickly will suddenly drive the main piston to the right, and in addition to operating as above described, it causes the emergency valve 31 to pass into the cup 43 compressing the spring 45 of said cup as well as causing compression of spring 37, driving said cup from its seat 46 and allowing the train pipe air to communicate with the brake cylinder via chamber 8, through the spaces between the fingers 41, chamber 47, passage 48, and check valve 52 which is unseated at that instant, the parts operating similarly as the corresponding parts in the old construction. When the pressure in the train pipe is allowed to resume its normal condition, the main piston is driven to the left, the parts are restored to their normal positions, and the brake cylinder communicates with the exhaust as already explained.

The points of advantage of the present valve over the old form reside in the substitution of the movable piston 10 having an independent movement and in advance of the stem 11, thus requiring less friction to close communication between the auxiliary reservoir and the train pipe; in the presence of the guide cages for the several valves; in the two flanges on the tube between the valves located to the left of the piston 10; in the presence of the guide cage for the cup surrounding the sleeve carrying the graduating stem. For it has been found in practice under the old valve that the several stems became disarranged axially when the same would stick and the parts cease to be responsive to the various conditions of air pressure within the train pipe, and thus fail to resume their normal positions at the proper time.

In emergency applications the cup 43 becomes unseated and at the same time the flange 19 at the left hand end of the stem 11 momentarily (that is, in proportion to the width of said flange) closes port 23, thus allowing the train pipe air with its large volume to well fill the brake cylinder, before said flange passes to the right of said port sufficiently to allow the air from the auxiliary reservoir to follow and combine with the train pipe air to complete the application of the brakes.

As seen from the drawings, the stems 11 and 30 being rigidly connected to one another practically act as one stem, and when one moves the other moves simultaneously therewith.

Having described my invention, what I claim is—

1. In an automatic fluid-pressure brake mechanism, a main valve chamber, a suitable stem adapted to control communication between the auxiliary reservoir and brake cylinder, and between the latter and the atmosphere, suitable valves at one end of said stem, a bushing for said valves, a guide cage extending beyond the limits of the bushing into the main valve chamber, a tube between said valves having a series of perforated flanges, a suitable valve on the opposite end of the stem for controlling air from the train pipe to the brake cylinder, and a bushing for said valve, substantially as set forth.

2. An automatic fluid-pressure brake mechanism comprising a suitable casing, a main valve chamber within said casing, a suitable stem movable within said casing, suitable valves carried at one end of the stem for controlling the air from the auxiliary reservoir to the brake cylinder, and from the latter to the atmosphere, a suitable valve on the opposite end of the stem for controlling air from the train pipe to the brake cylinder, and a movable piston carried by said stem, said piston having a slight movement in advance of the stem and adapted to control communication between the auxiliary reservoir and the train pipe, substantially as set forth.

3. In an automatic fluid-pressure brake mechanism, a suitable stem adapted to control communication between the auxiliary reservoir and brake cylinder, and between the latter and the atmosphere, suitable valves on said stem, a bushing for said valves, a tube between said valves having a series of flanges to guide said stem and valves, said flanges having suitable openings for the passage of air, a suitable valve on the opposite end of the stem for controlling air from the train pipe to the brake cylinder, a bushing for said valve, and a guide cage extending beyond the limits of said bushing for guiding said valve, substantially as set forth.

In testimony whereof I affix my signature in the presence of two witnesses.

HERMAN GUELS.

Witnesses:
FRANK LANSBERG,
JAMES J. O'DONOHOE.